(12) United States Patent
Farmanbar et al.

(10) Patent No.: US 9,510,228 B2
(45) Date of Patent: Nov. 29, 2016

(54) SYSTEM AND METHOD OF TRAFFIC ENGINEERING IN A SOFTWARE DEFINED RADIO ACCESS NETWORK

(71) Applicant: Huawei Technologies Co., Ltd., Shenzhen (CN)

(72) Inventors: Hamidreza Farmanbar, Ottawa, CA (US); Hang Zhang, Nepean, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 128 days.

(21) Appl. No.: 14/486,853

(22) Filed: Sep. 15, 2014

(65) Prior Publication Data

US 2016/0080257 A1    Mar. 17, 2016

(51) Int. Cl.
*H04W 28/02* (2009.01)
*H04W 40/04* (2009.01)
*H04W 72/12* (2009.01)
*H04L 12/721* (2013.01)

(52) U.S. Cl.
CPC ....... *H04W 28/021* (2013.01); *H04W 28/0247* (2013.01); *H04W 40/04* (2013.01); *H04W 72/1226* (2013.01); *H04L 45/38* (2013.01)

(58) Field of Classification Search
CPC ........... H04W 72/04; H04W 72/0433; H04W 72/044
See application file for complete search history.

(56) References Cited

U.S. PATENT DOCUMENTS

| | | | | |
|---|---|---|---|---|
| 2003/0142658 A1* | 7/2003 | Ofuji | ............ | H04W 72/10 370/349 |
| 2004/0174884 A1 | 9/2004 | Wright | | |
| 2005/0094607 A1* | 5/2005 | Zaki | ............ | H04L 1/0002 370/338 |
| 2006/0046658 A1* | 3/2006 | Cruz | ............ | H04W 28/22 455/67.11 |
| 2007/0025324 A1* | 2/2007 | Kim | ............ | H04L 29/06027 370/349 |
| 2012/0044944 A1 | 2/2012 | Kotha et al. | | |
| 2013/0182608 A1* | 7/2013 | Maggiari | ............ | H04L 41/0226 370/254 |
| 2014/0003232 A1* | 1/2014 | Guichard | ............ | H04L 67/16 370/230 |
| 2015/0055623 A1* | 2/2015 | Li | ............ | H04W 40/04 370/331 |
| 2015/0063144 A1* | 3/2015 | Kozat | ............ | H04W 40/12 370/252 |
| 2015/0124604 A1* | 5/2015 | Dao | ............ | H04W 28/0247 370/231 |

FOREIGN PATENT DOCUMENTS

| | | |
|---|---|---|
| CN | 101296178 A | 10/2008 |
| CN | 103188147 A | 7/2013 |

OTHER PUBLICATIONS

Liao et al., "Min Flow Rate Maximization for Software Defined Radio Access Networks," IEEE Journal on Selected Areas in Communications, vol. 32, No. 6, Jun. 2014, pp. 1282-1294.
International Search Report and Written Opinion received in Application No. PCT/CN2015/089258 mailed Feb. 11, 2015, 11 pages.

* cited by examiner

*Primary Examiner* — Benjamin H Elliott, IV
(74) *Attorney, Agent, or Firm* — Slater Matsil, LLP (57) ABSTRACT

An embodiment method of traffic engineering (TE) in a software defined radio access network (SD-RAN) includes determining, by a radio resource manager (RRM) at a wireless radio node, respective data rates for paths of a plurality of user equipments (UEs) wirelessly coupled to the wireless radio node. The RRM computes respective supported wireless rates for the paths of the plurality of UEs according to the respective data rates. The TE module receives respective allocated data rates for the paths of the plurality of UEs. The method also includes repeating the determining and the computing using the respective allocated data rates.

21 Claims, 5 Drawing Sheets

SYSTEM AND METHOD OF TRAFFIC ENGINEERING IN A SOFTWARE DEFINED RADIO ACCESS NETWORK

TECHNICAL FIELD

The present invention relates generally to traffic engineering (TE) in software defined radio access networks (SD-RANs) and, in particular embodiments, to a system and method for traffic engineering.

BACKGROUND

Generally, an SD-RAN includes an access network and a backhaul network. The backhaul network typically includes multiple fixed-capacity links among base stations, gateways, and data sources. Backhaul links are typically wired links, but can also be wireless. The access network generally includes multiple base stations, which are also referred to as radio nodes, access points, node Bs, or E-node Bs (eNBs). Radio nodes provide service, i.e., access, to the SD-RAN for one or more user equipments (UEs). UEs are sometimes referred to as stations, mobile stations, mobiles, terminals, users, or subscribers.

TE allows the SD-RAN to offer higher network capacity and improved user quality of experience through efficient use of multiple paths between sources and destinations. Additionally, TE gives network operators control over resource usage across the network. To optimize performance of the SD-RAN, the TE problem is generally structured as a balance of flow demand constraints, wired link capacity constraints, and wireless access resource constraints.

SUMMARY

An embodiment method of traffic engineering (TE) in a software defined radio access network (SD-RAN) includes determining, by a radio resource manager (RRM) at a wireless radio node, respective data rates for paths of a plurality of user equipments (UEs) wirelessly coupled to the wireless radio node. The RRM computes respective supported wireless rates for the paths of the plurality of UEs according to the respective data rates. The TE module receives respective allocated data rates for the paths of the plurality of UEs. The method also includes repeating the determining and the computing using the respective allocated data rates.

An embodiment method of TE in an SD-RAN includes receiving at least one supported wireless rate for the wireless radio node. The at least one supported wireless rate is received at a TE module from a wireless radio node. The TE module then computes new allocated data rates for paths of a plurality of UEs coupled to the wireless radio node. The new allocated data rates are computed according to the at least one supported wireless rate. The TE module then communicates the new allocated data rates to the wireless radio node.

An embodiment TE system for an SD-RAN includes a path selector, a radio scheduler interface, and a rate allocator. The path selector is configured to select paths for traffic for at least one radio node to which at least one UE is wirelessly coupled. The paths include wireless segments and fixed-capacity segments. The radio scheduler interface is configured to receive at least one supportable data rate for the at least one radio node. The rate allocator is configured to compute an allocated data rate for the paths of the at least one UE according to flow demand constraints, link capacities for the fixed-capacity segments, and the at least one supportable data rate.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

TE problem constraints include flow demand constraints, wired link capacity constraints, and wireless access resource constraints. Flow demand constraints on the SD-RAN are generally a function of the number of users, K, and their respective traffic demands, $d_1, d_2, \ldots d_K$. In practice, traffic for a given user, k, is routed over multiple paths, or $L_k$ paths. The constraint is modeled, for a given user, as the sum of allocated traffic over all paths is equal to the traffic demand for that user. For the SD-RAN as a whole, $$\sum_{j=1}^{l_k} x_j^k = d_k, \forall k$$

where $x_j^k$ is allocated traffic on the $j^{th}$ path for user k, $p_j^k$ where $j=1, \ldots l_k$. Wired link capacity is generally fixed, $c_a$, for a given wired link, a. The wired link capacity constraint is generally the sum of all allocated traffic over paths passing through a wired link should not exceed the wired link's capacity. For the SD-RAN as a whole, $$\sum_{p_j^k \text{ passing link } a} x_j^k \leq c_a, \forall a.$$

Wireless access node constraints are modeled for the purpose of TE. A wireless link capacity is distinct from a supportable data rate. The supportable data rate is a function of resources available for a given node and spectral efficiency, which is a metric generally representing quality of a given link. The wireless access node constraint is typically expressed as $$\sum_{p_j^k \text{ passing node } n} \frac{x_j^k}{S_{a(k,j)}} \leq r_n, \forall n$$

where $S_{a(k,j)}$ is the spectral efficiency for link a(k,j), where a(k,j) is the last hop, i.e., wireless link, of path j of user k, and $r_n$ represents the resources at wireless node n. Resources are typically scheduled by a radio node scheduler or radio resource manager (RRM). It is realized herein that accurate abstraction of radio node scheduling can be difficult. Furthermore, when multiple radio access technologies are present in the SD-RAN, different abstractions are needed for each technology. Accurate abstractions can be achieved, but generally at the cost of non-linear wireless access node constraints that complicate the TE problem and make it more difficult to solve. Alternatively, simpler abstractions can be solved more easily, but suffer inaccuracies. A TE module can use the abstraction to optimize traffic allocations among the various users and paths.

Solving the TE problem is generally done centrally, where flow demand constraints, wired link capacity constraints, and wireless access resource constraints converge. The TE module can push down data rates to the radio nodes and, in return, gets feedback in the form of link quality metrics, i.e., spectral efficiency. The spectral efficiencies for the various wireless links through a given node are then inputs to the scheduler abstraction, i.e., scheduler model.

It is realized herein the TE problem can be solved without the scheduler abstraction. It is further realized herein the TE problem can be decomposed, using an alternating direction method of multipliers (ADMM) algorithm, into a centralized TE subproblem that comprehends the backhaul network and fixed-capacity links, and a scheduling problem that comprehends wireless segments of the SD-RAN. The centralized TE subproblem, now decoupled from radio scheduling, is solved with respect to the flow demand constraints and the wired link capacity constraints. The scheduling subproblem is solved with respect to wireless access node constraints. The TE problem is expressed as $$\min_{x_j^k} \sum_{k=1}^{K} \sum_{j=1}^{l_k} U_j^k(x_j^k)$$

Such that:

$$\sum_{j=1}^{l_k} x_j^k = d_k, \quad (1)$$
$$\forall k$$

$$\sum_{p_j^k \text{ passing link } a} x_j^k \leq c_a, \quad (2)$$
$$\forall a$$

$$x_j^k = \hat{x}_j^k, \quad (3)$$
$$\forall k, j$$

$$\sum_{p_j^k \text{ passing node } n} \frac{\hat{x}_j^k}{S_a(k, j)} \leq r_n, \quad (4)$$
$$\forall n$$

where U is a convex function and $\hat{x}_j^k$ is an auxiliary variable for iterating between the TE subproblem and the scheduling subproblem.

It is realized herein the TE problem can be structured such that an ADMM algorithm can be used to perform the optimization using a partially augmented Lagrangian function:

$$L_\rho(x_j^k, \hat{x}_j^k, \delta_j^k) = \sum_{k=1}^{K} \sum_{j=1}^{l_k} U_j^k(x_j^k) + \sum_{k=1}^{K} \sum_{j=1}^{l_k} \delta_j^k(x_j^k - \hat{x}_j^k) + \frac{\rho}{2} \sum_{k=1}^{K} \sum_{j=1}^{l_k} (x_j^k - \hat{x}_j^k)^2$$

The ADMM algorithm is first initialized to $x_j^k(0)$, $\hat{x}_j^k(0)$, $\delta_j^k(0)$. The TE module solves the TE subproblem to obtain $x_j^k(t+1)$, subject to conditions (1) and (2) above:

$$\min_{x_j^k} L_\rho(x_j^k, \hat{x}_j^k(t); \delta_j^k(t))$$

The RRM solves the scheduling subproblem to obtain $\hat{x}_j^k(t+1)$, subject to condition (3) above:

$$\min_{x_j^k} L_\rho(x_j^k(t+1), \hat{x}_j^k; \delta_j^k(t))$$

The TE module and the RRM each update the Lagrange dual multipliers accordingly:

$$\delta_j^k(t+1) = \delta_j^k(t) + \rho(x_j^k(t+1) - \hat{x}_j^k(t+1))$$

For a more detailed description of the ADMM algorithm, refer to W.-C. Liao, M. Hong, H. Farmanbar, X. Li, Z.-Q. Luo, and H. Zhang, *Min Flow Rate Maximization for Software Defined Radio Access Networks*, IEEE JSAC, vol. 32, no. 6, June 2014.

Figure 1:
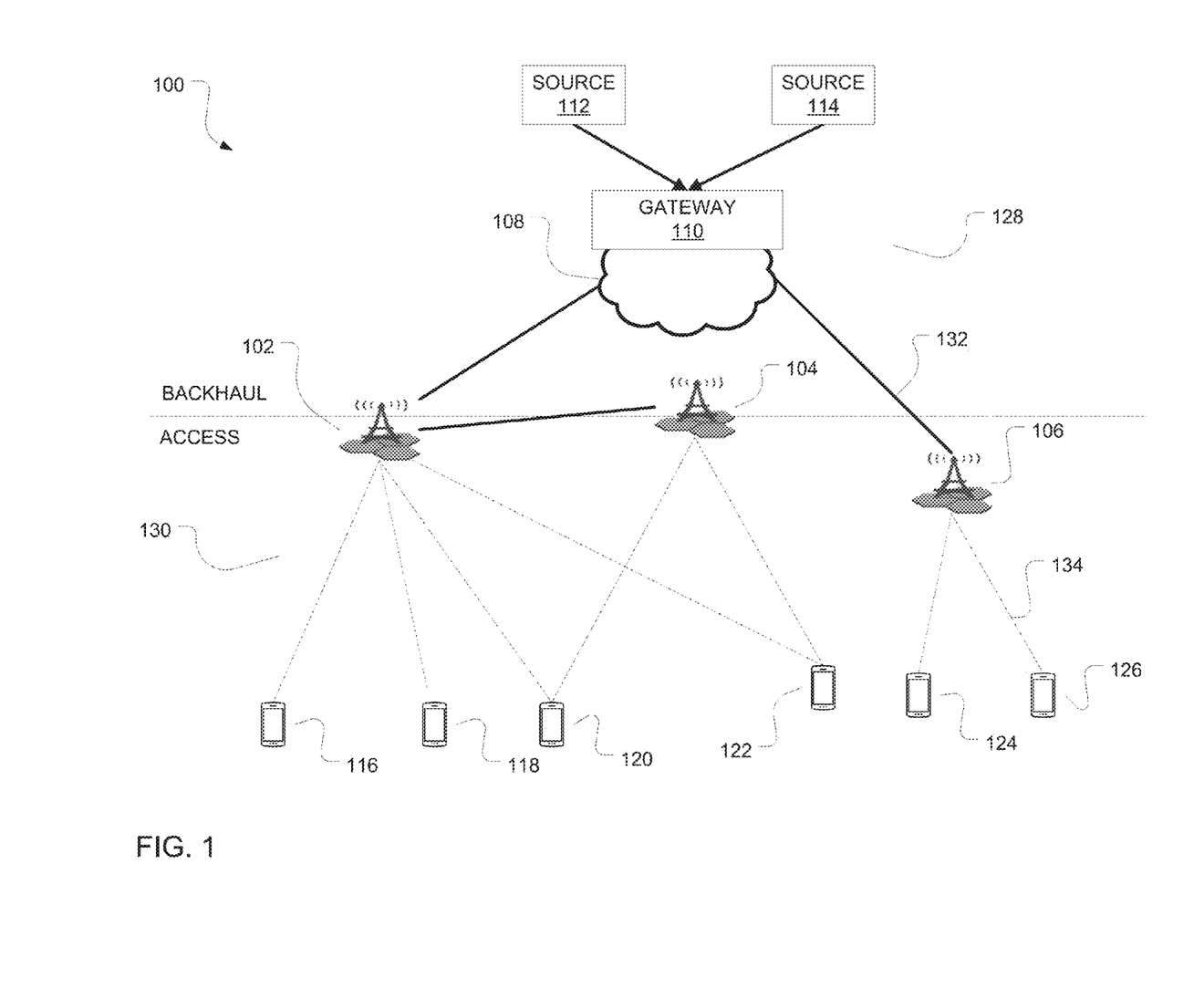
FIG. 1 is a block diagram of one embodiment of an SD-RAN.

FIG. 1 is a block diagram of one embodiment of a SD-RAN 100 within which the TE system or method of TE introduced herein may be embodied or carried out. SD-RAN 100 includes an access network 130 and a backhaul network 128. Access network 130 includes radio nodes 102, 104, and 106 providing service to UEs 116, 118, 120, 122, 124, and 126. The radio nodes are wirelessly coupled to the UEs by wireless links 134. The radio nodes connect to a network 108 in backhaul network 128 by backhaul links 132. Backhaul links 132 can be fixed-capacity wired links or wireless links.

Backhaul network 128 connects radio nodes and UEs to sources through multiple paths. Backhaul network 128 includes sources 112 and 114 that are accessible through a gateway 110. Traffic flows from sources 112 and 114 through gateway and over multiple paths through mesh network 108. Content is delivered to the radio nodes over fixed-capacity links 132.

For a given user, traffic can flow from source to destination over various wireless links to various radio nodes in access network 130. Traffic can flow through backhaul network 128 over multiple paths through mesh network 108 and gateway 110, including multiple fixed-capacity links.

Figure 2:
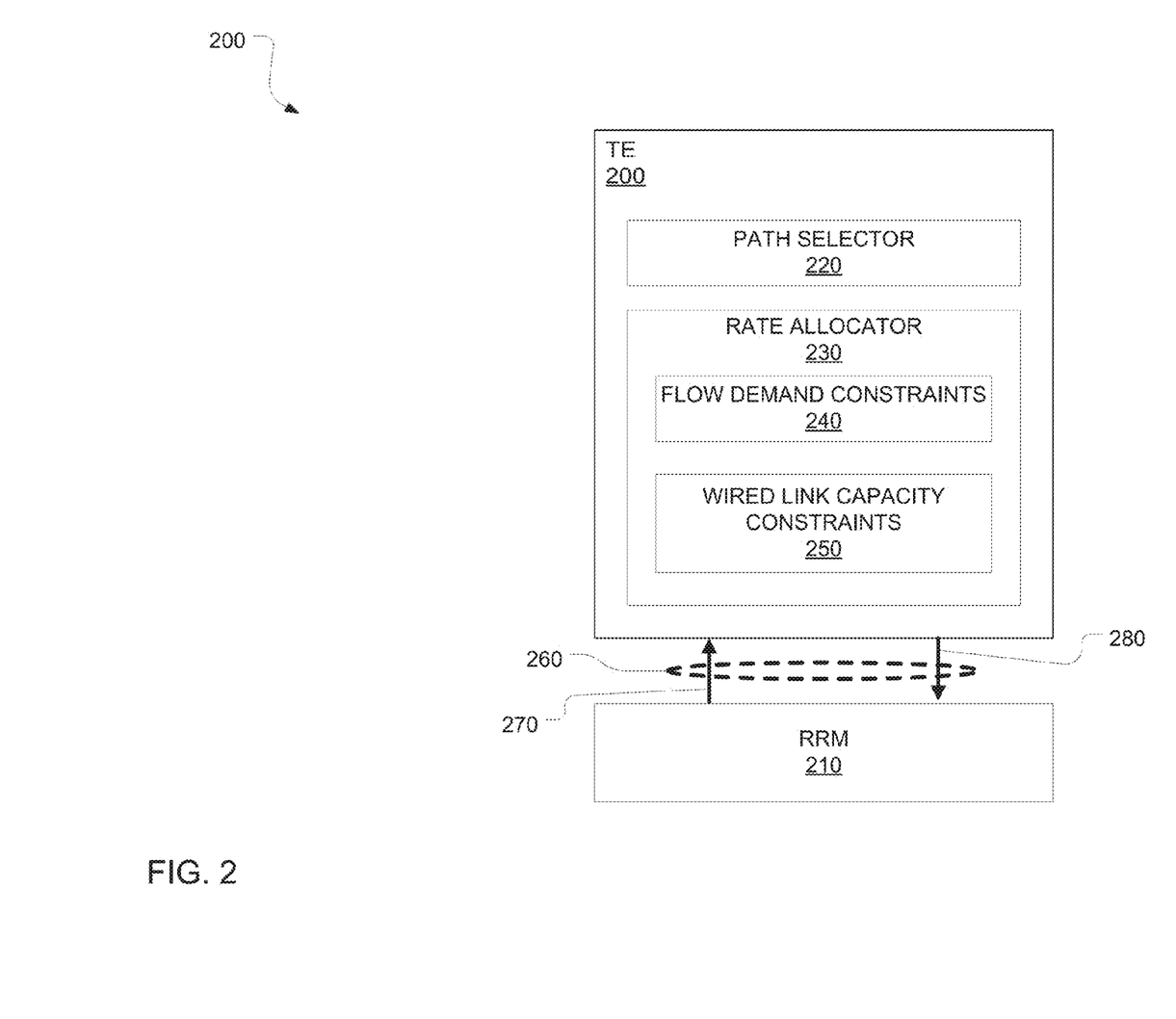
FIG. 2 is a block diagram of one embodiment of a TE system.

FIG. 2 is a block diagram of one embodiment of a TE system 200. TE system 200 includes a path selector 220, a rate allocator 230, and a scheduling interface 260. Scheduling interface 260 couples TE system 200 to an RRM 220. Rate allocator 230 includes flow demand constraints 240 and wired link capacity constraints 250. Path selector 220 and rate allocator 230 can be implemented in one or more processors, one or more application specific integrated circuits (ASICs), one or more field-programmable gate arrays (FPGAs), dedicated logic circuitry, or any combination thereof, all collectively referred to as a processor. RRM 210 can also be implemented in one or more processors, one or more ASICs, one or more FPGAs, dedicated logic circuitry, or any combination thereof, all also collectively referred to as a processor at a radio node. The respective functions for path selector 220, rate allocator 230, and RRM 210 can be stored as instructions in non-transitory memory for execution by a processor.

The SD-RAN includes an access network having at least one radio node to which one or more UEs are wirelessly coupled. The SD-RAN also includes a backhaul network connecting the radio nodes to various sources over fixed-capacity links. Path selector 220 selects paths through the SD-RAN for traffic to flow from one or more source to one or more destination. The paths include at least one wireless link and at least one fixed-capacity link. The traffic is for at least one UE wirelessly coupled to at least one radio node. Flow demand constraints 240 represent each user's traffic flow over all paths for that user. Wired link capacity constraints 250 represent the physical capacity of the wired links that are traversed by the multiple paths for the various users' traffic flows. A particular wired link has a fixed capacity that cannot be exceeded by the sum of all traffic over that link for all users and all paths.

Scheduling interface 260 includes a supportable rate feedback 270 and an allocated rate push 280. Rate allocator 230 allocates data rates for all paths for all users. The allocated rates are communicated to the RRMs at the radio nodes and their respective wirelessly coupled UEs using the allocated rate push 280. RRM 210 determines and feeds back at least one supportable rate for the radio node using supportable rate feedback 270. The at least one supportable rate can be a single supportable data rate for the radio node as a whole, or can be multiple supportable data rates for all paths of individual UEs.

In certain embodiments, an ADMM algorithm can be used to decompose the SD-RAN TE problem into a TE subproblem and a scheduling subproblem.

Rate allocator 230 begins with initial allocated rates for all paths of all UEs. RRM 210 receives the initial data rates over allocated rate push 280. In alternative embodiments, RRM 210 measures actual data rates for paths through access nodes. RRM 210 then performs scheduling and computes supportable data rates for each path, thereby solving the scheduling subproblem. RRM 210 communicates the computed supportable data rates back to TE system 200 using supportable rate feedback 270.

Rate allocator 230 uses the computed supportable rates in conjunction with flow demand constraints 240 and wired link capacity constraints 250 to compute new allocated rates to be used by the radio nodes and UEs for the next iteration. TE system 200 communicates the new allocated rates to the radio nodes and RRM 210 using allocated rate push 280. TE system 200 and RRM 210 continue to iterate in this manner until the allocated rates from TE system 200 and the supportable rates computed by RRM 210 converge. In certain embodiments, convergence is based on a certain number of iterations. In other embodiments, the allocated rates and supportable rates converge when a difference between the two falls below a threshold.

Figure 3:
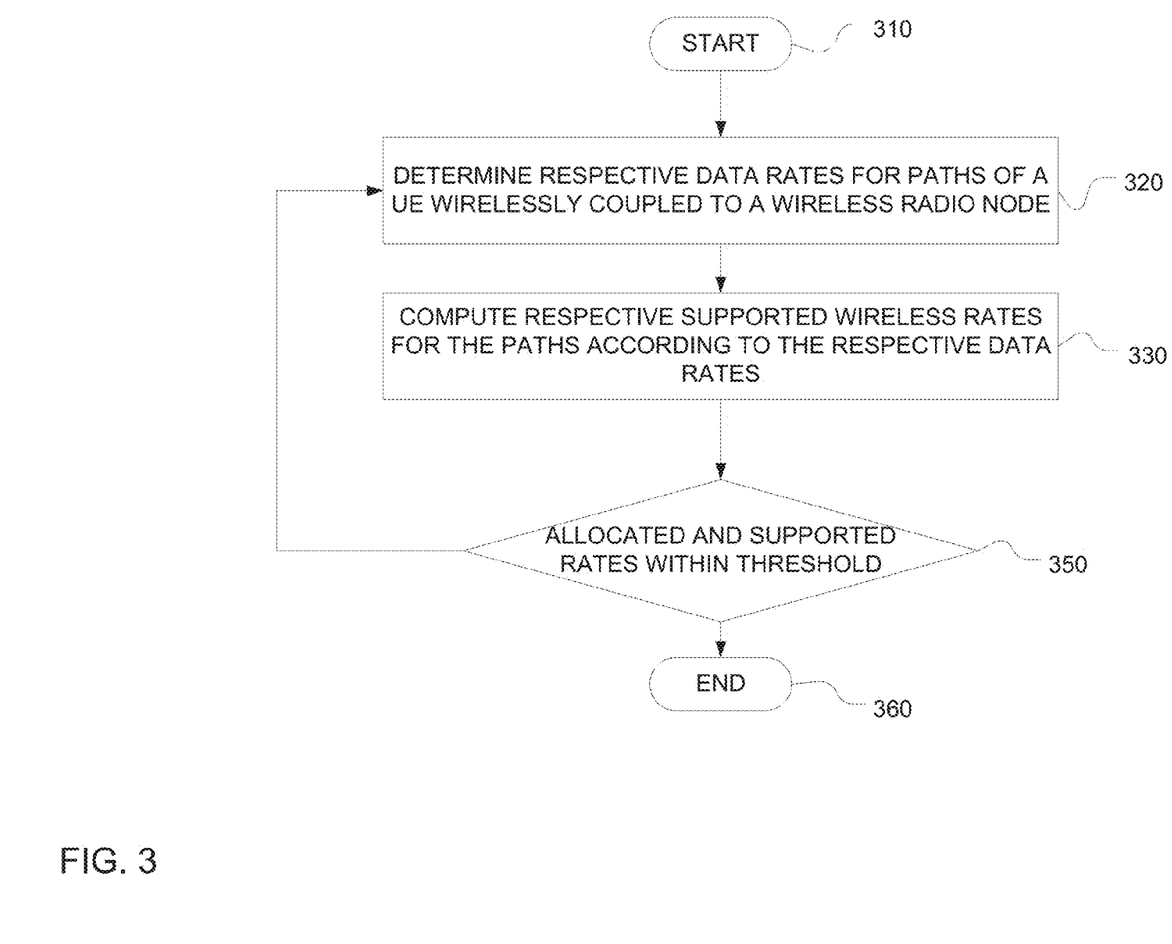
FIG. 3 is a flow diagram of one embodiment of a method of TE in an SD-RAN.

FIG. 3 is a flow diagram of one embodiment of a method of TE in a network. The method begins at a start step 310. The network generally includes a plurality of UEs wirelessly coupled to one or more radio nodes. In certain embodiments, the network is an SD-RAN. The network also includes a TE module, which is an entity within the network responsible for managing TE for the network and solving a centralized TE subproblem. The TE subproblem generally includes optimizing with respect to flow demand constraints and wired link capacity constraints. The network generally includes an RRM associated with one or more radio nodes for solving scheduling subproblems. The RRM, in certain embodiments, can be located at a radio node. In certain embodiments, the RRM is centralized. The scheduling subproblem can be implemented centrally or distributed. At a determining step 320, an RRM at a radio node determines respective data rates for paths for a plurality of UEs to which the radio node is wirelessly coupled. In certain embodiments, the determining can be accomplished by receiving reported data rates from the UEs themselves or from the TE module. The RRM can also measure the data rates of paths through radio nodes.

At a computing step 330, the RRM computes respective supported wireless rates for each path of the plurality of UEs. Supported wireless rates are computed according to the respective data rates determined in determining step 320. In certain embodiments, the supported wireless rates also comprehend available bandwidth and resources. Supported wireless rates are generally computed according to a scheduling policy for the radio node. In certain embodiments, the supported wireless rates are communicated to the TE module for the TE module to use in solving its TE subproblem. In some embodiments, the supported data rate communicated to the TE module is a single data rate for the radio node. In other embodiments, a supported data rate is communicated to the TE module for all paths of each UE.

Certain embodiments include a receiving step at which the RRM receives respective allocated data rates for each path of the plurality of UEs. In embodiments where the RRM communicates the supported wireless rates to the TE module, the respective allocated data rates are computed according to the supported wireless rates and communicated back to the RRM in response. The respective allocated data rates are then applied in the network.

The method iterates, repeating determining step 320 and computing step 330, until the allocated data rates and the supported wireless rates converge to within a threshold. The threshold is evaluated at a threshold checking step 350. The method then ends at an end step 360.

Figure 4:
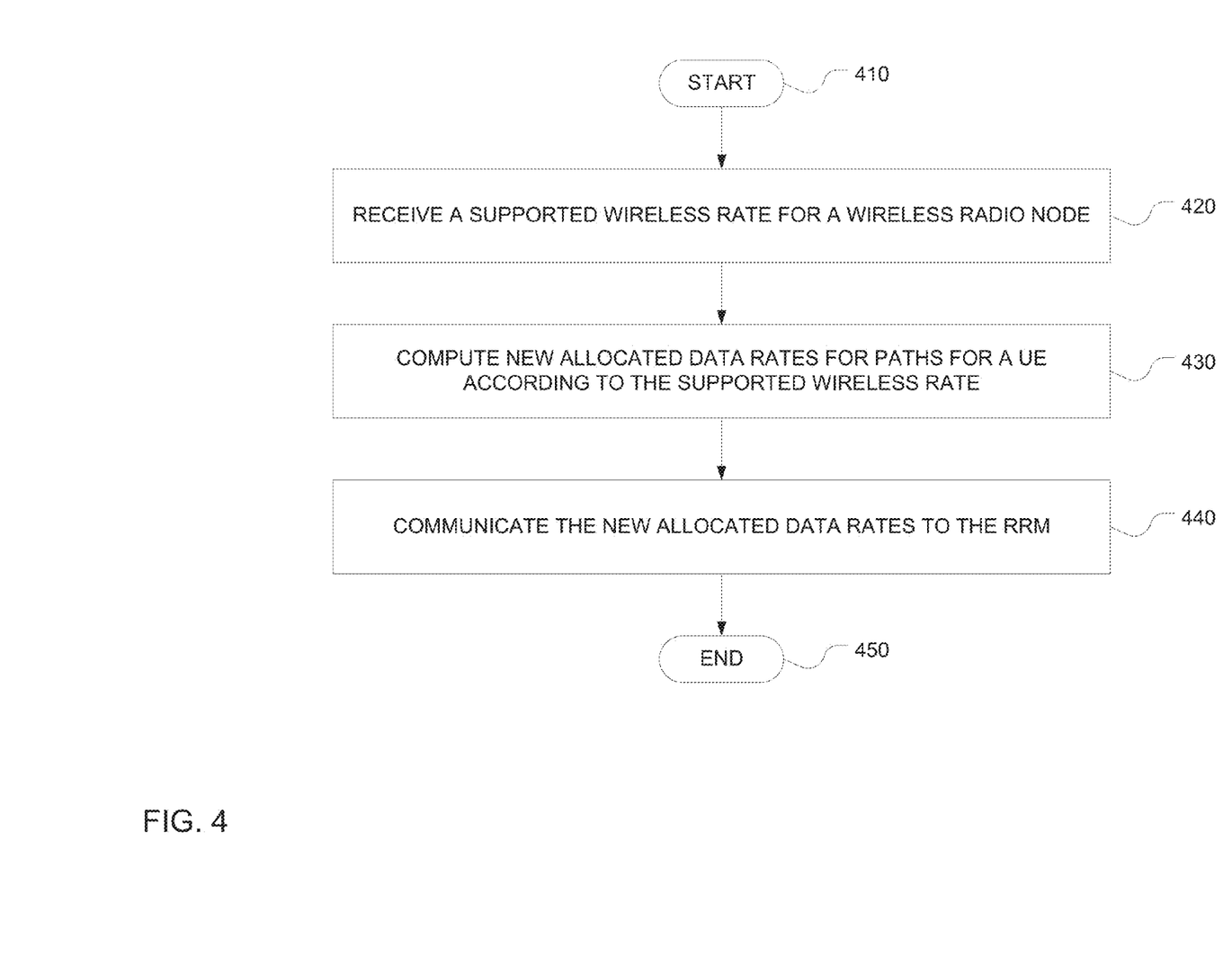
FIG. 4 is a flow diagram of another embodiment of a method of TE in an SD-RAN.

FIG. 4 is a flow diagram of another embodiment of a method of TE in a network. The method begins at a start step 410. The network generally includes a plurality of UEs wirelessly coupled to at least one wireless radio node. In certain embodiments, the network is an SD-RAN. The network also includes a TE module, which is an entity within the network responsible for managing TE for the network and solving a centralized TE subproblem. The TE subproblem generally includes optimizing with respect to flow demand constraints and wired link capacity constraints. The network generally includes an RRM associated with one or more radio nodes for solving the scheduling subproblem.

In certain embodiments, the method includes an initialization of allocated data rates for paths of the UEs coupled to the wireless radio node. The initial allocated data rates are used temporarily until the RRM determines supported wireless rates.

At a receiving step 420, at least one supported wireless rate for a wireless radio node is received at a TE module. In certain embodiments, the at least one supported wireless rate is for the wireless radio node as a whole. In other embodiments, supported wireless rates for all paths of each UE coupled to the wireless radio node are received.

At a computing step 430, new allocated data rates are computed by the TE module. The new allocated data rates are computed according to the at least one supported wireless rate received at receiving step 420. In alternative embodiments, the TE module also considers flow demand constraints and link capacity constraints for fixed-capacity links, wired links, or backhaul links. The TE module, in solving the TE subproblem, attempts to optimize the allocated data rates using the at least one supported wireless rate as an input while satisfying the flow demand and link capacity constraints.

At a communicating step 440, the new allocated data rates are communicated by the TE module to the RRM, which applies them to the connected UEs during scheduling. As the method iterates, the TE module continues to receive new supported wireless rates from the RRM and computes new allocated data rates. The iterations continue until a condition is met, such as a convergence threshold or number of iterations, among others. The method then ends at an end step 450.

Figure 5:
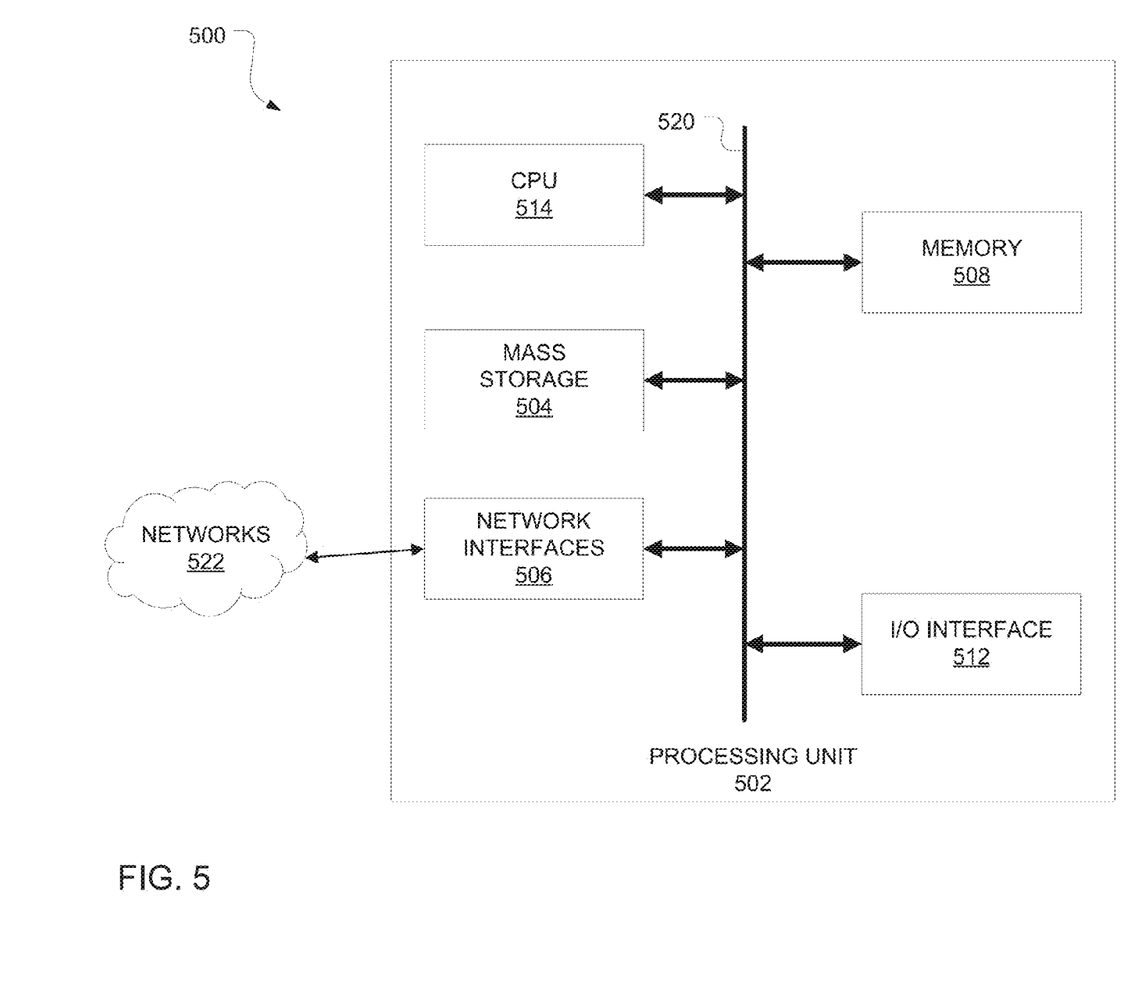
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components. Levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

I/O interface 512 provides interfaces to couple external input and output devices to the processing unit 502. Examples of input and output devices include a display, a mouse, a keyboard, and printer. Other devices may be coupled to the processing unit 502 and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

In certain embodiments, computing system 500 may be implemented logically on one or more processors, one or more application specific integrated circuits (ASICs), one or more field-programmable gate arrays (FPGAs), dedicated logic circuitry, or any combination thereof, all collectively referred to as a processor. In certain embodiments, computing system 500 may be implemented virtually in a data center or cloud computing environment. The respective functions for processing unit 502 can be stored as instructions in non-transitory memory for execution by a processor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of traffic engineering (TE) in a network, comprising:
   determining, by a radio resource manager (RRM) associated with a radio node, respective data rates for paths for a user equipment (UE) wirelessly coupled to the radio node, wherein the paths are between the UE and at least one source and pass through the radio node;
   computing, by the RRM, respective supported wireless rates for the paths according to the respective data rates;
   communicating, by the RRM, a supported wireless rate for the radio node to a TE module, wherein the supported wireless rate is a function of allocated traffic for the radio node, resources available at the radio node, and a spectral efficiency for a last wireless link of each path passing through the radio node;
   receiving, by the RRM, respective allocated data rates from the TE module; and
   repeating the computing according to the respective allocated data rates, the communicating, and the receiving.

2. The method of claim 1 further comprising initializing the respective data rates for the paths.

3. The method of claim 1 wherein determining the respective data rates comprises measuring respective rates for the paths of the UE.

4. The method of claim 1 wherein determining the respective data rates comprises receiving the respective allocated data rates from the TE module.

5. The method of claim 1 further comprising decomposing a TE problem for paths of the network into a TE subproblem and a scheduling subproblem according to an alternating direction method of multipliers (ADMM) algorithm.

6. The method of claim 5 wherein the computing comprises solving the scheduling subproblem to determine the respective supported wireless rates.

7. The method of claim 1 wherein the communicating further comprises communicating, by the RRM, the respective supported wireless rates for the paths to a TE module.

8. A method of traffic engineering (TE) in a network, comprising:
receiving, at a TE module, a supported wireless rate associated with a radio node;
computing, by the TE module, new allocated data rates for paths of a user equipment (UE) coupled to the radio node according to the supported wireless rate, wherein the supported wireless rate is a function of allocated traffic for the radio node, resources available at the radio node, and a spectral efficiency for a last wireless link of each path passing through the radio node; and
communicating the new allocated data rates to a radio resource manager (RRM) associated with the radio node.

9. The method of claim 8 further comprising:
determining, by the TE module, initial allocated data rates for the paths; and
communicating the initial allocated data rates to the RRM.

10. The method of claim 8 wherein the computing comprises computing the new allocated data rates according to flow demand constraints and wired link capacity constraints.

11. The method of claim 8 further comprising decomposing a TE problem for the network into a TE subproblem and a scheduling subproblem according to an alternating direction method of multipliers (ADMM) algorithm.

12. The method of claim 11 wherein the computing comprises solving the TE subproblem to determine the new allocated data rates.

13. The method of claim 8 further comprising receiving, at the TE module, respective supported wireless rates for paths of a plurality of UEs.

14. The method of claim 8 further comprising:
receiving, at the TE module, from the radio node, at least one new supported wireless rate for the radio node; and
repeating the steps of computing and communicating.

15. A traffic engineering (TE) system for a network, comprising:
a non-transitory memory storage comprising instructions; and
one or more processors in communication with the memory, wherein the one or more processors execute the instructions for:
selecting paths for traffic for at least one radio node to which at least one user equipment (UE) is wirelessly coupled, wherein the paths include wireless segments and backhaul segments;
receiving at least one supportable data rate for the at least one radio node; and
computing an allocated data rate for the paths of the at least one UE according to flow demand constraints, link capacities for fixed-capacity segments, and the at least one supportable data rate.

16. The TE system of claim 15 wherein the one or more processors execute the instructions for receiving respective supportable data rates for a plurality of paths for a plurality of UEs wirelessly coupled to the at least one radio node.

17. The TE system of claim 15 wherein the one or more processors execute the instructions for communicating the allocated data rate to the at least one radio node.

18. The TE system of claim 15 wherein, upon receipt of a latest at least one supportable data rate for the at least one radio node, the one or more processors execute the instructions for computing a new allocated data rate for the paths of the at least one UE according to the flow demand constraints, the link capacities, and the latest at least one supportable data rate.

19. The TE system of claim 15 wherein the one or more processors execute the instructions for receiving a new at least one supportable data rate and re-computing a new allocated data rate for the paths of the at least one UE.

20. The TE system of claim 19 wherein the one or more processors execute the instructions for iterating the receiving the new at least one supportable data rate and the re-computing until a difference between the new at least one supportable data rate and the new allocated data rate falls below a threshold.

21. The TE system of claim 15 wherein the one or more processors are couplable to a radio resource manager (RRM) configured to compute the at least one supportable data rate for the at least one radio node according to at least one measured data rate for the paths of the at least one UE.

* * * * *